United States Patent

[11] 3,576,524

| [72] | Inventor | Harry Heggie Ogilvy<br>Middlesex, England |
|---|---|---|
| [21] | Appl. No. | 648,893 |
| [22] | Filed | June 26, 1967 |
| [45] | Patented | Apr. 27, 1971 |
| [73] | Assignee | British Railways Board<br>London, England |

[54] SYSTEMS FOR TRANSMITTING INFORMATION TO MOVING TRAINS
8 Claims, 4 Drawing Figs.

[52] U.S. Cl........................................... 340/32,
340/47, 246/63, 246/175
[51] Int. Cl........................................... G08g 1/09
[50] Field of Search........................................... 340/32, 33,
38 (L), 258 (Inquired); 246/34 (CT) (Inquired),
63 (C) (Inquired), 187 (B) (Inquired)

[56] References Cited
UNITED STATES PATENTS
| 3,044,043 | 7/1962 | Wendt.......................... | 340/32 |
| 2,896,204 | 7/1959 | Gille............................ | 340/258UX |
| 3,029,893 | 4/1962 | Mountjoy..................... | 246/187BUX |

Primary Examiner—Thomas B. Habecker
Attorney—Sommers and Young

ABSTRACT: A system for transmitting local information to a moving train in binary code comprising a number of conductor loops arranged one after the other along the track at the local information point and energized from an alternating current source and a loop aerial on the train which becomes inductively coupled with each of the conductor loops in turn as the train passes the local information point to provide one bit of information from each conductor loop.

Inventor
Harry H. Ogilvy
by Sommers & Young
Attorneys

Inventor
Harry H. Ogilvy
by Sommers & Young
Attorneys

SYSTEMS FOR TRANSMITTING INFORMATION TO MOVING TRAINS

BACKGROUND OF THE INVENTION

The control or supervision of high-speed trains requires the transmission of local or geographical information, hereafter referred to as "local information," related to features of the track, e.g. gradient, line speed, station identification and distances appropriate to these features. The specification of various quantities with a sufficient degree of safety and reliability requires the information capacity of the system to be considerable; additionally circumstances may not justify transmission continuously from a central source. Ideally therefore local information should be transmitted from the track at the appropriate position using devices which require the minimum of maintenance. Traditional methods, e.g. magnets or tuned circuits arranged to influence locomotive equipment during the instant of transit become unduly complex and inflexible when designed for more than a few units of information.

The basis of this invention is to transmit the local information in the form of a binary code, consisting of a predetermined number of elements or bits of information each of which therefore has one of two values denoted conventionally by 1 and 0 and each element being of a positively identifiable nature.

SUMMARY OF THE INVENTION

According to this invention there is provided a system for transmitting local information from a railway track to a moving train, comprising a number of conductor loops arranged one after the other along the track at a local information point, an alternating current source arranged to energize said conductor loops, and detecting means on a train arranged to be inductively coupled with each of said conductor loops in turn as the train passes the local information point whereby to receive one element or bit of local information from each conductor loop, a conductor loop laid oppositely to another conductor loop producing an inductive coupling with said detecting means in antiphase to that produced by said other conductor loop so that the elements or bits of information are provided in binary code.

The conductor loops may be energized from a transmitter on the train which produces an alternating current in the conductor loops having a frequency of 20—150 kHz. Alternatively the conductor loops may be energized from a stationary alternating current source having a frequency in the same range, through electrical conductors extending continuously along the track from one local information point to another.

Hence the local information derived from a point along the track comprises a combination of bits of information in binary code and each bit may be preselected as a 1 or 0, by laying the conductor loop from which it is derived in the clockwise or anticlockwise direction. Thus the local information can be given the desired content by arranging the loops to provide the bits of information according to a predetermined combination. For example if the local information comprises four bits, this may form the binary number 1011 or 1001 or any other of the possible binary numbers with four bits depending upon the desired content of the local information to be communicated to the train.

The local information provided at a point along the track may be in a plurality of parts, each part consisting of a number of bits of information and being derived from conductor loops spaced along the track from the conductor loops providing the other parts of the local information. For example the local information may be composed of three parts as follows:

| No. of bits | Content |
|---|---|
| x | Routing of information to appropriate apparatus within locomotive. |
| y | Information, e.g. gradient and value of speed restriction or station identification. |
| z | End of message including approximate distance to next local information point. |

Hence the local information may be considered as a telegram communicated to the train from the track. Only certain combinations of the bits of information will have valid meanings; thus to provide safety in transmission and to prevent evaluation of conductor loops traversed in the reverse direction redundancy will be used appropriate to the degree of integrity required.

DETAILED DESCRIPTION OF INVENTION

Figure 1:
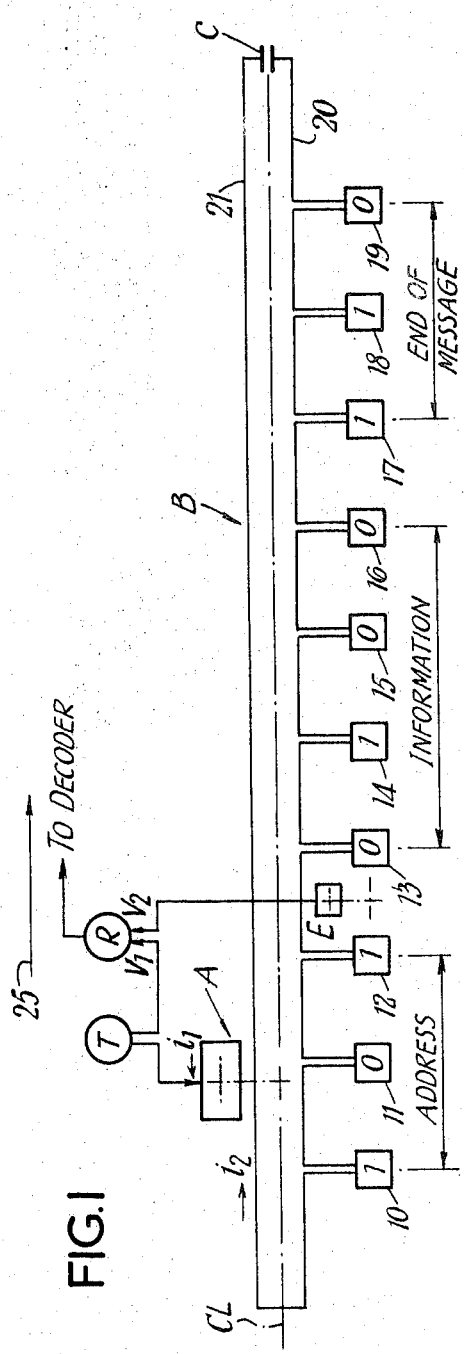
FIG. 1 shows a first system in accordance with the invention.
Figure 2:
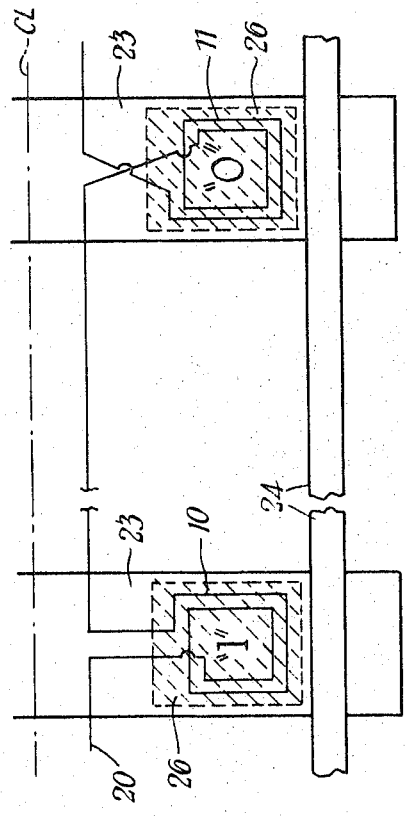
FIG. 2 shows in more detail the conductor loop arrangement of FIG. 1.

Referring to FIGS. 1 and 2, the chain-dotted line CL represents the centerline of a railway track. The local information point comprises a closed circuit B comprising a series of conductor loops 10 to 19 and conductors 20 and 21 extending parallel to each other along the railway track. At one end capacitor C is connected across the conductors 20 and 21. A typical spacing of the conductors 20 and 21 is 30 cm.

Referring more particularly to FIG. 2, only the two conductor loops 10 and 11 are shown, but it will be apparent that the remaining conductor loops 12 to 19 have an arrangement similar to one or other of the loops 10, 11. The conductor loops 10 and 11 are connected in series with each other by the conductor 20 and are shown as having two turns but this could be any desired number. The loops 10 and 11 are wound oppositely to each other; thus as seen in FIG. 2 the loop 10 is wound clockwise and the loop 11 counterclockwise. For the purposes of the present description the convention will be adopted that the clockwise wound loop 10 provides the binary bit 1 and the anticlockwise wound loop provides the binary bit 0. The remaining conductor loops 12 to 19 have been designated in FIG. 1 with the binary bit which they provide, namely 1 or 0; hence it can be seen that at the local information point shown in FIG. 1 the conductor loops 10, 12, 14, 17 and 18 are wound clockwise and the remainder counterclockwise. The conductor loops 10 to 19 are each mounted on a respective tie 23 and together form a series extending along the track adjacent one rail 24 of the track.

To energize the conductor loops a transmitter T is provided on the locomotive of the train which is assumed to be travelling in the direction of arrow 25. The transmitter comprises an oscillator and power amplifier which may be of known form and provides a high level output, for example 30 watts, to the transmitting aerial A. The transmitter T also provides a low level signal $V_1$ which is fed to the receiver R to polarize the latter, the receiver R comprising basically a phase sensitive detector of conventional form.

The aerial A which is the form of a horizontally disposed rectangular loop has for example a length of 60 cm. and a width of 30 cm. The aerial A is arranged symmetrically about the centerline 1 of the track and at a height of about 3 cms. above the track. Thus one of the longer sides of the aerial A travels along the track parallel to the conductor 20 and in the vertical plane containing this conductor and the opposite longer side of the aerial is similarly orientated with respect to the conductor 21.

The electromagnetic field generated by the aerial A due to the current $i_1$, flowing around its loop will induce a current $i_2$ to flow in the closed circuit B; this is enhanced by the capacitor C which is of a value to resonate the circuit B at the transmitter frequency. The current $i_2$ flows through the conductor loops and produces a local alternating electromagnetic field associated with each conductor loop.

A receiving aerial E is provided on the locomotive of the train. This aerial is, like the aerial A, in the form of a rectangular loop disposed in a horizontal plane. Its position on the locomotive is to one side of the centerline of the track such that as the latter passes through the local information point, the aerial E passes directly over each of the conductor loops 10 to 19 in turn. As the aerial is passing over a conductor loop, the local field will induce an alternating voltage $V_2$ of the same frequency as $V_1$ in it and this is fed to the receiver R. Depending upon whether the conductor loop in question is wound clockwise or anticlockwise the induced voltage $V_2$ will either be in phase or in antiphase with the polarizing voltage $V_1$. By the convention adopted for the purposes of this description the clockwise wound conductor loops produce binary bit 1 and the counterclockwise wound conductor loops will produce binary bit 0. It will be readily apparent to one skilled in the art that the desired phase can equally well be produced by the choice of connections of the coil to the alternating-current source. Thus the receiver R compares the relative phases of $V_1$ and $V_2$ as the aerial E passes over each conductor loop and produces a first form of output signals representative of binary bits 1 and a second form of output signals representative of the binary bits 0 in accordance with this convention. These output signals are fed to a conventional decoder which evaluates the sequence of binary bits of information in order to initiate automatically the control of the train demanded by this local information, or by means of a visual or oral display instructs the train driver to do so.

In the series of conductor loops 10 to 19 the following is one example of the way in which the conductor loops may be allocated to give different parts of local information in order to compose a track telegram. The conductor loops 10 to 12 are used to give the address, i.e. identification of the local information point so that the information is routed to the appropriate control apparatus in the locomotive, the conductor loops 13 to 16 are used to provide the content of the message, and the conductor loops 17 to 19 are used to provide the end of the message.

If the information in any part of the local information is required to be varied the combination of the binary bits has to be varied, and in the present example this is easily achieved simply by inverting one or more of the conductor loops as can be seen from FIG. 2. Conveniently each of the conductor loops is embedded in a mass of electrically insulating material, represented by the cross-hatching 26 in FIG. 2, which serves as a protective coating and also enables easy inversion of the conductor loop.

The aerials A to E are spaced longitudinally from each other by a distance to ensure sufficient attenuation of the direct coupling between the aerials; the spacing may be for example 2½ meters.

In FIG. 1 the loops of the aerials A and E are shown to lie in horizontal planes. It is also possible to mount the aerial E and the conductor loops with their planes vertical, the aerial E then being at substantially the same level as the conductor loops to give good coupling with the latter. This will minimize the direct coupling between the aerials A and E and will also reduce the direct coupling of the aerial A with the actual conductor loops rather than the parallel conductors 20 and 21. With this arrangement the information provided by a conductor loop can still be changed from 1 to 0 and vice versa by rotating the conductor loop through 180°.

Figure 3:
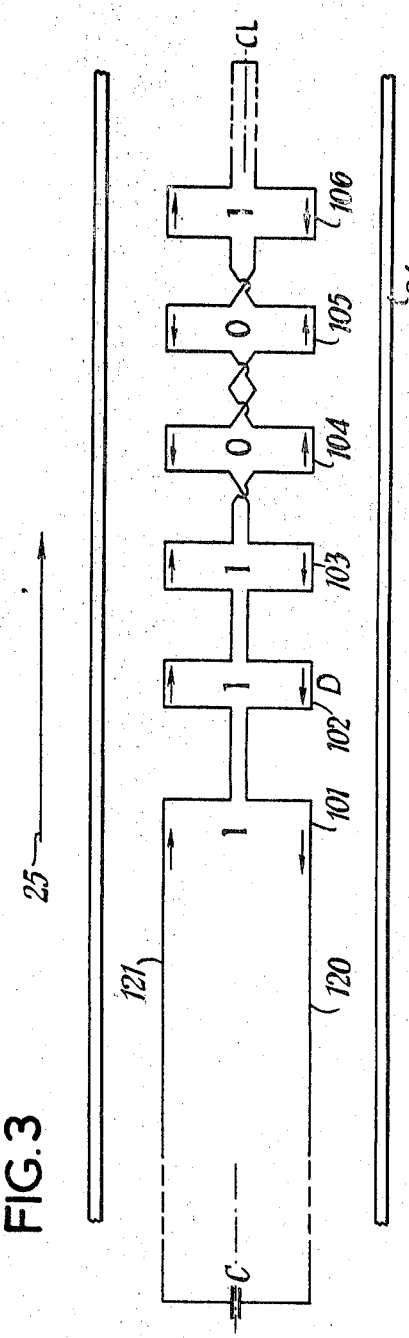
FIG. 3 shows a second arrangement for the conductor loops.

Referring now to FIG. 3, this shows an alternative form of closed circuit to that shown in FIG. 2.

In the closed circuit of FIG. 3 the conductor loops 101 to 106 are shown. Each of the conductor loops 101 to 106 is symmetrically disposed about the centerline of the track and hence the receiving aerial E on the locomotive runs along the centerline of the track. For this reason the transmitting aerial A and the receiving aerial E must be separated by a distance at least equal to the length of track occupied by the conductor loops, and the lengthwise extent of the conductors 120 and 121 along the track before reaching the conductor loops must exceed the length of track occupied by the conductor loops in order to maintain correct energization of the conductor loops during the complete passage of the receiving aerial E over them.

Figure 4:
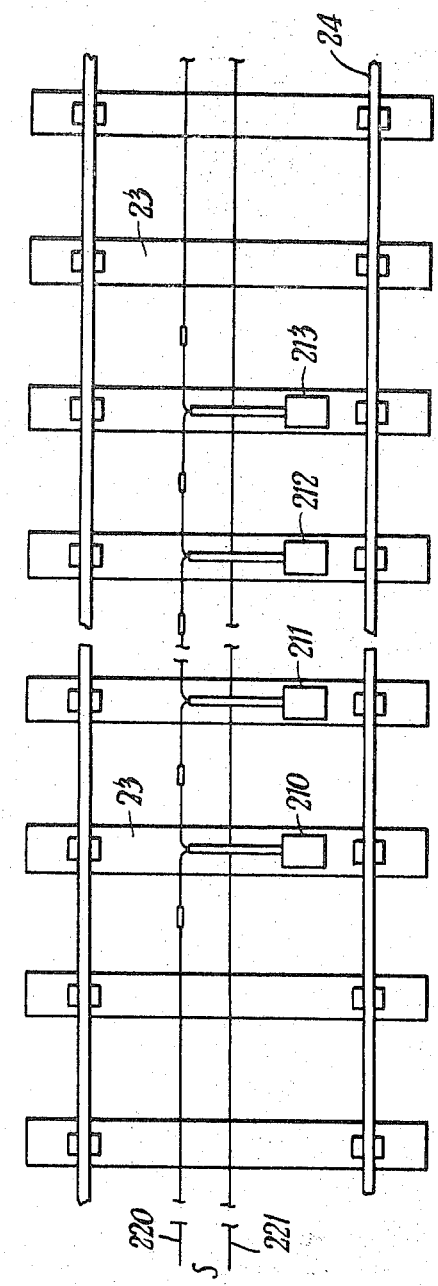
FIG. 4 shows a third arrangement for the conductor loops.

Referring now to FIG. 4 this shows a closed circuit somewhat similar to FIGS. 1 and 2 in that it has conductor loops 210 to 213 of similar form and disposition to the conductor loops 10 to 19 of FIGS. 1 and 2. In this case however, the conductor loops are energized from a stationary alternating current source S through conductors 220 and 221. Several local information points may be energized from the same source. The conductors 220 and 221 in addition to energizing the local information points may also provide a continuous communication link with the train by means of a detector coil on the train which is inductively coupled to one or both the conductors 220 and 221.

From the above-described exemplary embodiments it will be seen that the invention provides a local information circuit which provides information in binary code and with a capacity proportional to the distinct combinations of binary bits possible with the number of conductor loops used. It will also be seen that the system is substantially maintenance free, and in the case where the power supply is carried by the train requires no trackside power supply.

I claim:

1. A system for transmitting binary coded data from a wayside data transmitting location to a moving vehicle comprising, a plurality of spaced, discrete conductor loops at each said location one for each bit of said coded data and positioned sequentially in the direction of vehicle movement along the wayside, an alternating-current source for energizing each said conductor loop, producing a magnetic field in the vicinity of each loop which is either of a first relative phase or a second opposite relative phase dependent upon the direction of current flow in said loop, and detector means on said vehicle including first means adapted to be inductively coupled with each said conductor loop in sequence as said vehicle passes said data transmitting location, said detector means further including second means responsive to the inductive coupling of said first means with a conductor loop which provides a magnetic field of said first phase to provide a first phase manifestation representative of a one bit and being responsive to the inductive coupling of said first means with a conductor loop providing a magnetic field of said second opposite phase to provide a second phase manifestation representative of a zero bit, and decoder means responsive to the sequential reception of said first and second phase manifestations to provide a composite signal representative of the binary coded data transmitted from the wayside to said vehicle.

2. A system according to claim 1 wherein said alternating-current source comprises a transmitter on said vehicle, the output of said transmitter being fed to a transmitting aerial on the vehicle, and circuit means including said conductor loops which is inductively coupled to said aerial to cause an induced current to flow in said conductor loops as said vehicle passes said data transmitting location.

3. A system according to claim 2, wherein said detector means includes a receiving loop which is inductively coupled with each conductor loop in turn as said vehicle passes said data transmitting location and further includes means responsive to the relative phase of the signal induced in said receiving loop upon each inductive coupling with a respective inductor loop with the signal provided by said alternating-current source to provide thereby said first and second manifestations.

4. A system according to claim 2, wherein said vehicle is a train riding on a track and said conductor loops are disposed to one side of the centerline of the track, said detecting means including a receiving loop which is arranged to pass directly above said conductor loops and said transmitting aerial being arranged to pass along the centerline of the track.

5. A system as claimed in claim 4, wherein said circuit means comprises a closed circuit including a pair of conductors extending one on either side of the centerline of the track and connected to each other at their ends, said conductor loops being connected in series with each other through one of said pair of conductors.

6. A system as claimed in claim 1, wherein said conductor loops are invertible to reverse the direction of winding of the conductor loops to permit thereby selective alteration of the transmitted binary code.

7. A system as claimed in claim 2, wherein said circuit means comprises a pair of conductors extending on either side of the centerline of the track over a first portion of the track and joined to each other at one end and connected at their other end to said conductor loops which extend over a second portion of the track and are disposed symmetrically about the centerline of the track, the length of said first portion of the track exceeding the length of the second portion of the track and the transmitting aerial and the detecting means on the train being arranged to move along the centerline of the track and being spaced from each other longitudinally by a distance exceeding the length of the second portion of the track.

8. A system as claimed in claim 1, wherein said conductor loops are energized from a stationary alternating-current source.